United States Patent
Zhang et al.

(10) Patent No.: US 6,605,565 B1
(45) Date of Patent: Aug. 12, 2003

(54) NANOCRYSTAL CERIUM ZIRCONIUM COMPOSITE OXIDE, ITS PREPARATION AND APPLICATION

(75) Inventors: Deyuan Zhang, Shanghai (CN); Zhenhua Wang, Shanghai (CN); Shixin Lu, Shanghai (CN); Jieda Wu, Shanghai (CN); Yeming Wang, Shanghai (CN); Yuxiang Yang, Shanghai (CN); Shaogang Wang, Shanghai (CN)

(73) Assignees: Shanghai Yue Long Non-Ferrous Metals Ltd., Shanghai (CN); Tong Ji University, Shanghai (CN)

( * ) Notice: Subject to any disclaimer, the term of this patent is extended or adjusted under 35 U.S.C. 154(b) by 0 days.

(21) Appl. No.: 09/496,748

(22) Filed: Feb. 3, 2000

(30) Foreign Application Priority Data

Feb. 15, 1999 (CN) .......................... 99102251 A (51) Int. Cl.[7] .......................... B01J 23/10; C04B 35/50; C01F 17/00; C01G 25/02
(52) U.S. Cl. ...................... 502/304; 502/302; 502/303; 502/308; 502/349; 501/152; 423/593
(58) Field of Search ................. 502/302, 303, 502/304, 305, 308, 321, 322, 323, 349, 350, 351; 423/61, 71, 76, 115, 21.1, 263, 593, 608, 407, 411, 412; 252/FOR 253, FOR 254, 520.2, 520.5, 521.11

(56) References Cited

U.S. PATENT DOCUMENTS

| | | | |
|---|---|---|---|
| 5,238,673 A | * | 8/1993 | Bruno et al. ................. 423/598 |
| 5,420,086 A | * | 5/1995 | Brandau et al. ............. 501/103 |
| 5,470,910 A | * | 11/1995 | Spanhel et al. ............. 524/785 |
| 5,534,308 A | * | 7/1996 | Bamberg et al. ............. 427/454 |
| 5,637,258 A | * | 6/1997 | Goldburt et al. ....... 252/301.4 R |
| 5,693,299 A | | 12/1997 | Chopin et al. |
| 5,709,786 A | * | 1/1998 | Friese et al. ................. 204/421 |
| 5,712,218 A | | 1/1998 | Chopin et al. |
| 5,721,057 A | * | 2/1998 | Bamberg et al. ............. 428/469 |
| 5,750,459 A | * | 5/1998 | Marella et al. ............. 502/304 |
| 5,897,675 A | * | 4/1999 | Mangold et al. ............... 51/309 |
| 5,908,800 A | * | 6/1999 | Bonneau et al. ............. 501/103 |
| 5,976,476 A | * | 11/1999 | Blanchard et al. ........ 423/213.2 |
| 5,989,507 A | * | 11/1999 | Sung et al. ............... 423/213.5 |
| 6,034,029 A | * | 3/2000 | Wulff-Doring et al. ..... 502/308 |
| 6,051,529 A | * | 4/2000 | Brenzy ........................ 502/302 |
| 6,068,828 A | * | 5/2000 | Hata et al. .................. 423/608 |
| 6,103,660 A | * | 8/2000 | Yperen et al. ............... 502/327 |
| 6,139,814 A | * | 10/2000 | Shipagov et al. ............ 423/592 |
| 6,150,299 A | * | 11/2000 | Umemoto et al. ........... 502/304 |

FOREIGN PATENT DOCUMENTS

| | | |
|---|---|---|
| CN | 89103518 | 12/1989 |
| CN | 95119160 | 10/1996 |
| CN | 95119163 | 10/1996 |
| CN | 95119164 | 10/1996 |
| CN | 94194552 | 12/1996 |
| CN | 96196505 | 9/1998 |

OTHER PUBLICATIONS

Abstract of FR 5712218. Jan. 27, 1998.
Abstract of FR 5693299. Dec. 2, 1997.

* cited by examiner

*Primary Examiner*—Cam N. Nguyen (57) ABSTRACT

A nanocrystal cerium zirconium composite oxide and its preparation and application are disclosed. The nanocrystal cerium zirconium composite oxide of the present invention comprises 4–98% by weight of $CeO_2$ and 1–95% by weight of $ZrO_2$, the crystalline particle size thereof is 100 nm or less, and the ignition loss thereof after igniting at 900° C. for one hour is smaller than 5%.

13 Claims, 6 Drawing Sheets

NANOCRYSTAL CERIUM ZIRCONIUM COMPOSITE OXIDE, ITS PREPARATION AND APPLICATION

BACKGROUND OF THE INVENTION

The present invention relates to a nanocrystal cerium zirconium composite oxide, and the preparation and application thereof. More specifically, the present invention relates to a nanocrystal cerium zirconium composite oxide comprising 4–98% by weight of $CeO_2$ and 1–95% by weight of $ZrO_2$.

Cerium oxide, zirconium oxide and cerium-zirconium composition have been used as post-combustion catalyst to treat the exhaust from the internal combustion engine. The using of cerium oxide, zirconium oxide and cerium-zirconium composition as multiple functional catalyst has been disclosed in the Chinese Patent Applications 96196505.3 and 94194552.9 (both by Rhone-Poulenc Chimie, France), 95119164.0, 95119160.8 and 95119163.2 (by Nippon Santoku Kinzoku Kogyou Kabushiki Kaisha), and 89103518.4 (by Nippon Shokubai Kagaku Kogyou Kabushiki Kaisha).

The commercially available catalysts comprising cerium-zirconium oxide composition can not only oxidize carbon monoxide and hydrocarbon present in the exhaust, but also reduce the nitrogen oxide therein, so they are referred to as "tri-functional catalysts". To obtain a composition containing mixed cerium and zirconium oxides as its main components, the conventional preparation method is:

(1) preparing a liquid mixture containing cerium compound and zirconium compound;
(2) contacting the above liquid mixture with carbonate or bicarbonate to form a reacting medium, the pH of which is neutral or basic (generally the pH being controlled to 8–11);
(3) separating and recovering the resulting precipitates; and
(4) calcining the precipitates.

A mixed cerium-zirconium oxide having a relatively large specific surface area can be obtained by this method, however, as disclosed in the above references, the products usually exist in the form of non-compounds. In other words, in the resulting catalyst, it can be found that the two components exist as a simple physical mixture of well separated cerium oxide and zirconium oxide particles, as also confirmed by the X-ray diffraction analysis thereof.

SUMMARY OF THE INVENTION

It is an object of the present invention to provide a nanocrystal cerium zirconium composite oxide which has a large specific surface area, high chemical reactivity and low ignition loss, the ignition loss thereof after igniting at 900° C. for one hour being less than 5%.

It is another object of the present invention to provide a nanocrystal cerium zirconium composite oxide with excellent thermal stability, the cerium zirconium composite oxide of the present invention remaining as a single phase after igniting at high temperature for a prolonged period of time.

In the present invention, a nanocrystal cerium zirconium composite oxide and its preparation and application are disclosed. The nanocrystal cerium zirconium composite oxide of the present invention comprises 4–98% by weight of $CeO_2$ and 1–95% by weight of $ZrO_2$, the crystalline particle size thereof is 100 nm or less, and the ignition loss after igniting at 900° C. for one hour is smaller than 5%.

DETAILED DESCRIPTION OF THE INVENTION

The nanocrystal cerium zirconium composite oxide with the above characteristics are obtained by using the novel preparation method of the present invention.

Thermal decomposing the corresponding cerium zirconium precursor compound containing hydrazine (or hydrazine salt) at 200–1000° C. can obtain the nanocrystal cerium zirconium composite oxide of the present invention, said precursor compound is selected from the nitrate, chloride, oxalate, carbonate and hydroxide of cerium and zirconium or the mixture thereof.

The above precursor compound containing hydrazine or hydrazine salt may be prepared by co-precipitating, mixing or other methods:

(1) The co-precipitating method comprises first adding hydrazine (or hydrazine salt) into cerium compound or zirconium compound and then co-precipitating; or adding hydrazine (or hydrazine salt) into the mixed solution of cerium-zirconium compound and then co-precipitating.

(2) The mixing method comprises adding hydrazine or hydrazine compound into the mixture of cerium compound and zirconium compound and then agitating homogeneously.

The nanocrystal cerium zirconium composite oxide can be produced by heating the above cerium-zirconium precursor compound to decompose it, cooling to room temperature, deagglomerating, and sieving.

The advantages of the method of the present invention are:

The hydrazine (or hydrazine salt) decomposes at 180–300° C. and simultaneously releases a large amount of gas and heat, the instantaneous releasing of heat causes the precursor compound to decompose more completely, and the large amount of gas produced at the same time makes the crystalline particles of the thermal decomposition product difficult to agglomerate and grow, so that the crystalline particles of the thermal decomposition product thus obtained are smaller than those of the product obtained by the thermal decomposition of the same precursors which do not contain hydrazine (or hydrazine salt), thus the product of the present invention has higher activity and thermal stability, as well as a lower ignition loss when igniting.

The nanocrystal cerium zirconium composite oxide obtained by the method of the present invention is a novel multiple component composite oxide of the solid solution type, it comprises 4–98% by weight of $CeO_2$ and 1–95% by weight of $ZrO_2$. The crystalline particle size of the Nanocrystal cerium zirconium composite oxide of the present invention is 100 nm or less, the specific surface area thereof as measured by BET method is 5–120 $m^2/g$, it has a relatively high chemical activity and thermal stability, and the ignition loss after ignition at 900° C. for one hour is smaller than 5%. The nanocrystal cerium zirconium composite oxide of the present invention can remain as a single phase after igniting at high temperature for a prolonged period of time. Particularly, when the composite oxide has cerium as its major component, i.e. the content of $CeO_2$ is 70–98% by weight, it remains as a single phase after igniting at 1100° C. for 12 hours.

The nanocrystal cerium zirconium composite oxide of the present invention may also contain 0.01–10% by weight of other elements, said other elements are selected from the group comprising rare earth elements, hafnium, silicon, aluminum and molybdenum. The performance of the Nanocrystal cerium zirconium composite oxide of the present invention is even better when incorporating these elements.

The nanocrystal cerium zirconium composite oxide of the present invention has excellent performances when used as an abrasive, catalyst or in environmental protection industry, it has a bright prospect of wide application, especially, nanocrystal oxide is an superior abrasive for the present-day high quality grinding.

The excellent performances of the nanocrystal cerium zirconium composite oxide of the present invention are further illustrated with reference to the following figures and examples.

Figure 1:
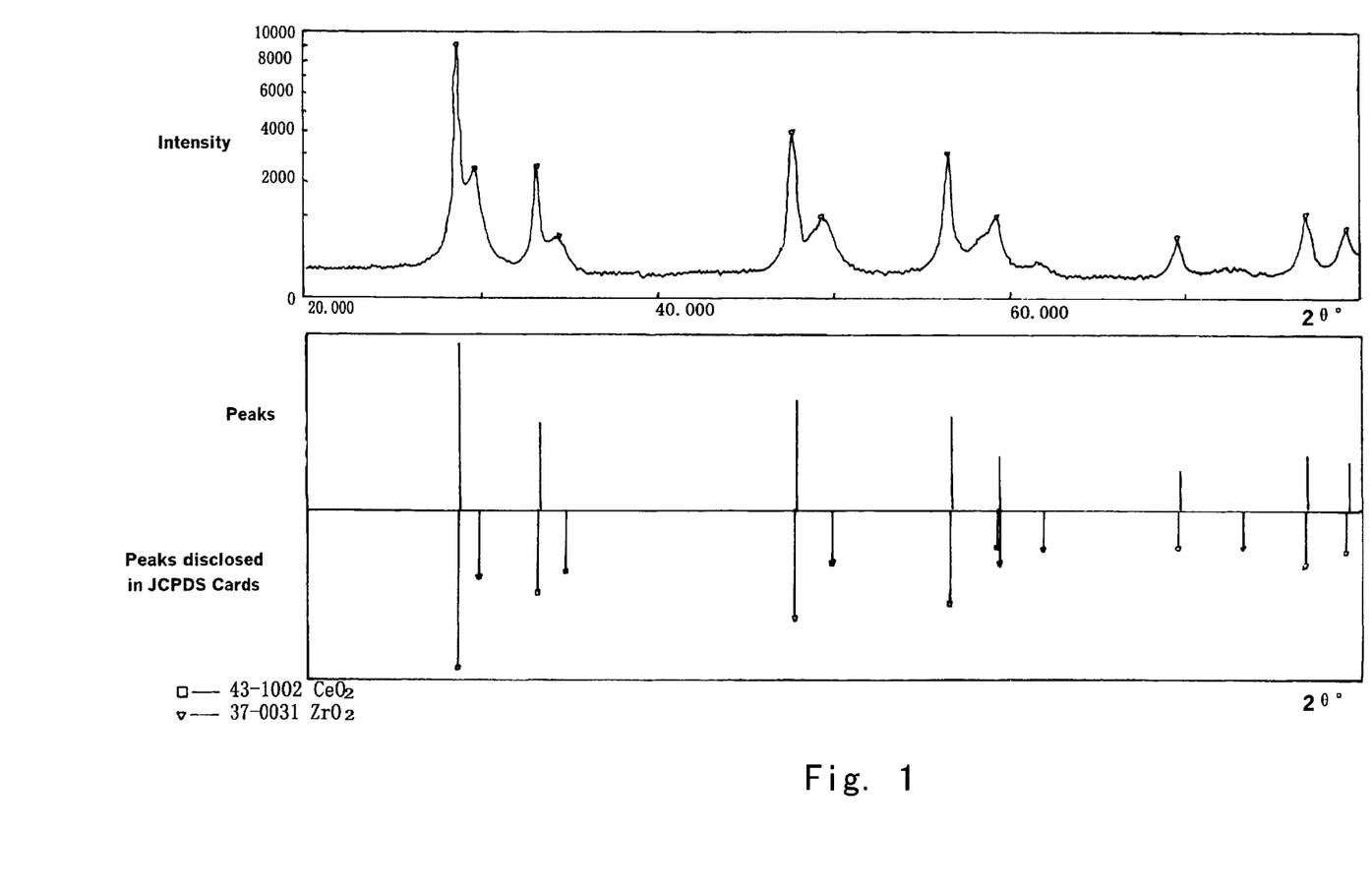
FIG. 1 is an X-ray diffraction pattern of the cerium zirconium composition obtained by conventional method.

It can be seen clearly from FIG. 1 that in the cerium zirconium composition obtained by conventional methods the $CeO_2$ phase and the $ZrO_2$ phase are present simultaneously.

Figure 2:
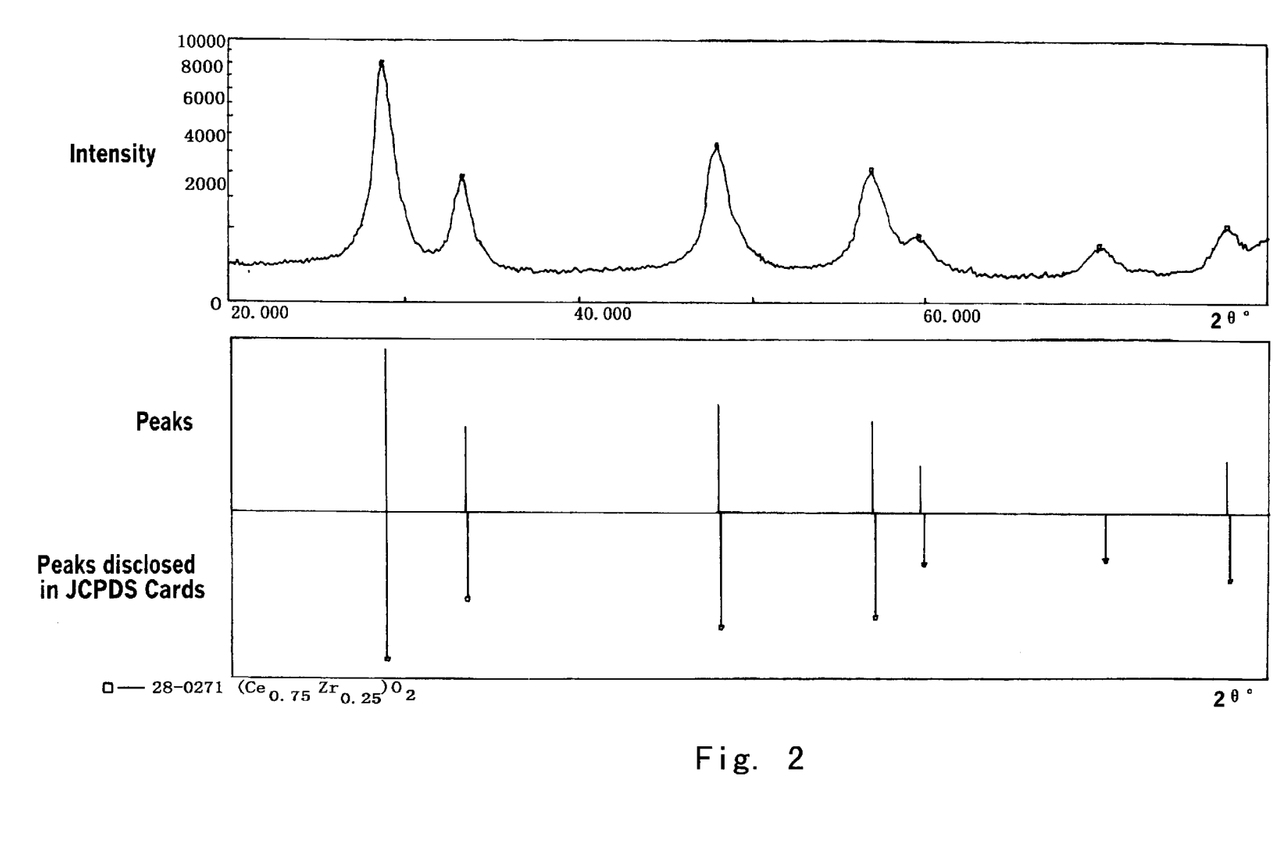
FIG. 2 is an X-ray diffraction pattern of a nanocrystal cerium zirconium composite oxide obtained by the method of the present invention, the composite oxide comprises 75% by weight of $CeO_2$ and 25% by weight of $ZrO_2$.

From FIG. 2, it can be confirmed that the nanocrystal cerium zirconium composite oxide of the present invention is a solid solution.

Figure 3:
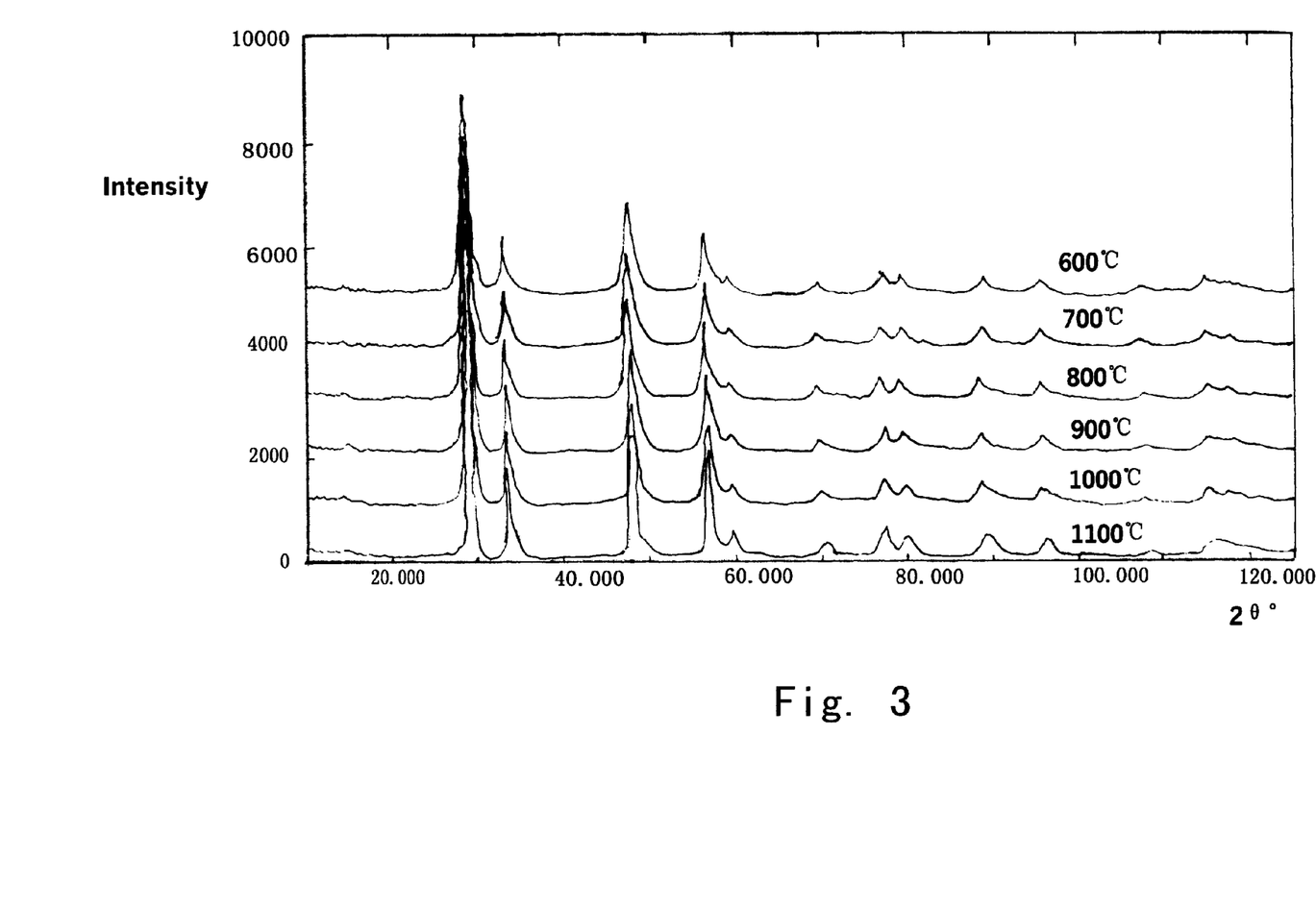
FIG. 3 is an X-ray diffraction pattern of a nanocrystal cerium zirconium composite oxide obtained by the method of the present invention, the composite oxide has been ignited at a high temperature.
Figure 4:
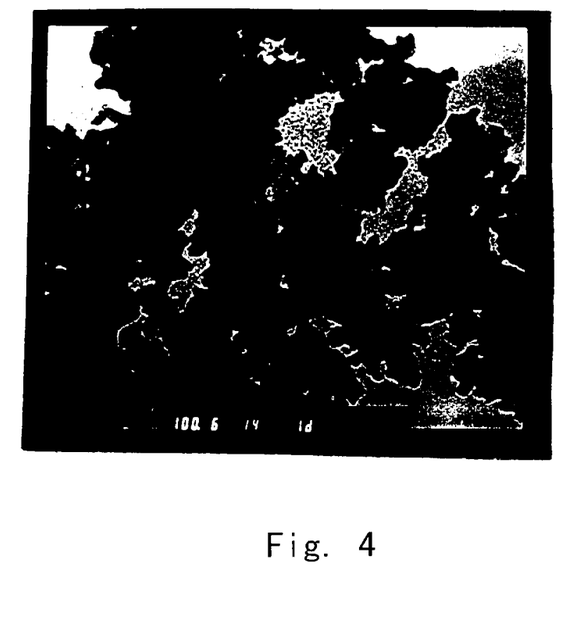
FIG. 4 is an electron microscopic photograph of a nanocrystal cerium zirconium composite oxide obtained by the method of the present invention (10000×, 1 cm thereon is equivalent to 100 nm).

From FIG. 3, it is shown that after igniting for a prolonged period of time (the samples have been ignited respectively at 600° C., 700° C., 800° C., 900° C., 1000° C. and 1100° C. for 12 hours), the nanocrystal cerium zirconium composite oxide of the present invention remains as a single phase.

Figure 5:
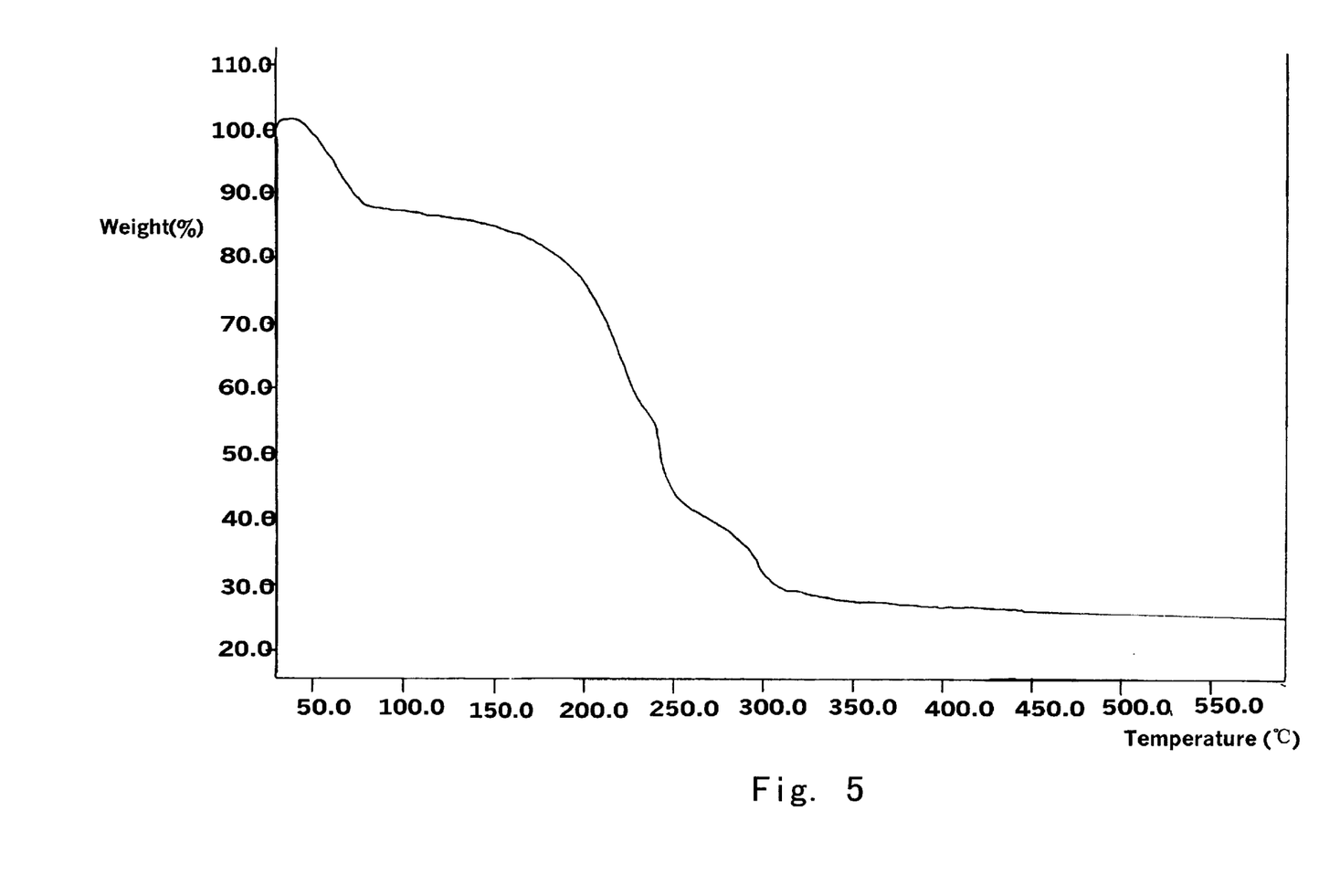
FIG. 5 is a thermal-gravimetric curve of the cerium-zirconium precursor compound containing hydrazine of the present invention.
Figure 6:
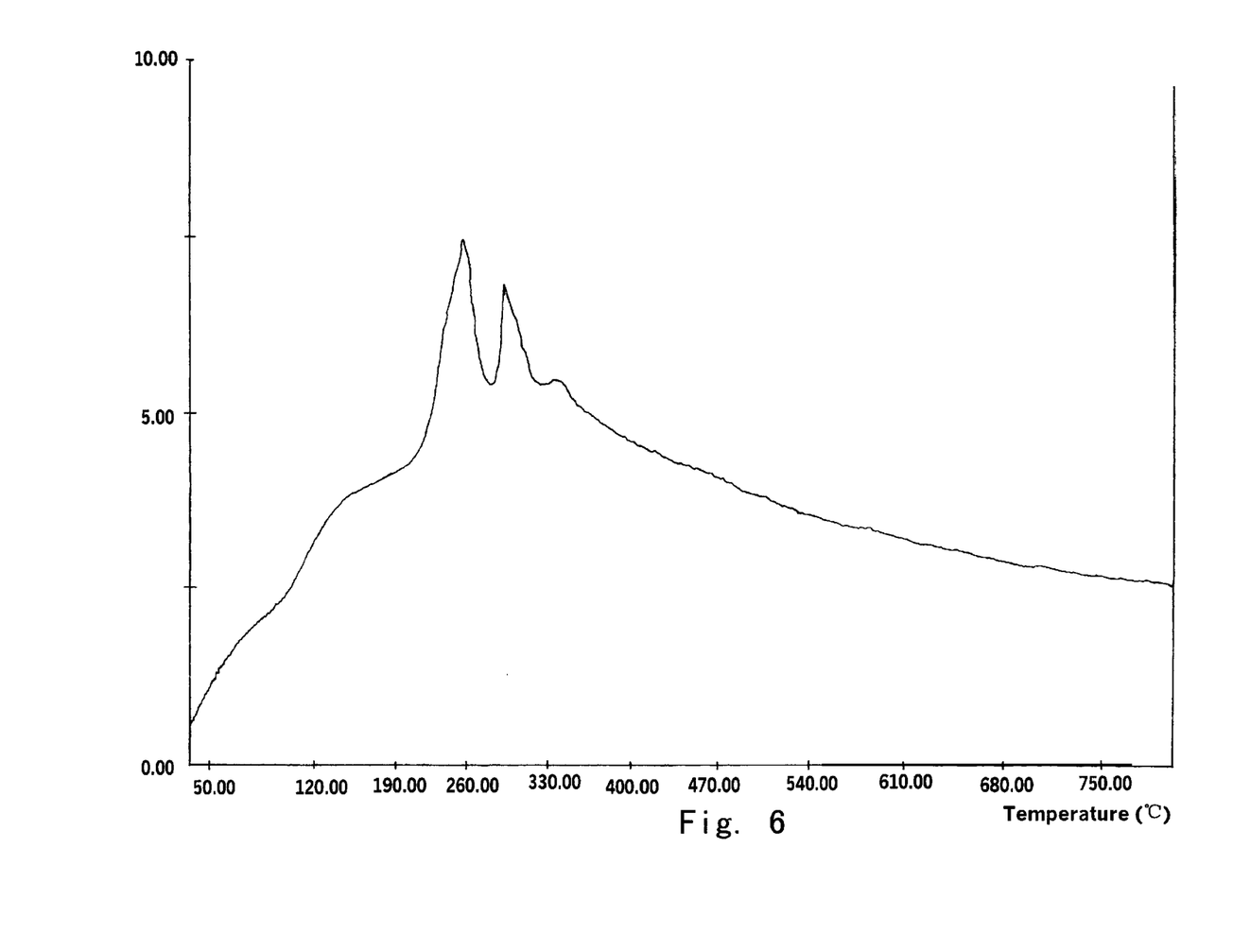
FIG. 6 is a differential thermal analysis curve of the cerium-zirconium precursor compound containing hydrazine of the present invention.

It is shown in FIGS. 5 and 6 that the compound containing hydrazine decomposes at 200–300° C., releasing instantaneously a large amount of gas and heat, causing the cerium zirconium precursor compound to decompose completely, and making the crystalline particles of the product difficult to agglomerate and grow, so that a cerium zirconium composite oxide with superior properties is obtained.

EXAMPLE 1

396 g of cerium oxalate and 133 g of zirconium oxychloride were mixed with an oxalic acid solution containing 0.2 g of molybdenum oxide, the solution was agitated homogeneously, dried at 100–105° C., taken out from the oven and allowed to cool down, 180 ml of hydrazine was then added into the mixture, stirred homogeneously, put into a high temperature furnace to raise the temperature gradually to 500–580° C., held at that temperature for 0.5 hour, taken out from the furnace and allowed to cool down. A light yellow cerium zirconium composite oxide was obtained, the crystalline particle size thereof was 60–80 nm.

EXAMPLE 2

A cerium nitrate solution containing 7.5 g of $CeO_2$ was mixed with a zirconium nitrate solution containing 2.5 g of $ZrO_2$, $H_2C_2O_4$ and aqueous ammonia were used to precipitate cerium zirconium, the pH of the solution was adjusted to basic, then 20 ml of hydrazine was added thereinto and the solution was stirred homogeneously. After filtering, the resulting product was dried at 105° C., 0.5 g of molybdenic acid was added into the product and stirred, and the mixture was ignited at 400–450° C. for 1 hour. A light yellow cerium zirconium composite oxide was obtained, the crystalline particle size thereof was 80–100 nm.

EXAMPLE 3

The same procedure of Example 1 was repeated, except that the hydrazine added was 120 ml and 150 ml respectively. The specific surface area of the resulting light yellow cerium zirconium composite oxide was 75.4 $m^2/g$ and 82.8 $m^2/g$ respectively, and the ignition loss after igniting at 900° C. for 1 hour was 2.9% and 3.1% respectively.

EXAMPLE 4

27.2 g of Ce(OH) and 114 g of $ZrOCl_2$ were mixed together, dried at 100–120° C., taken out from the oven and allowed to cool down, 20 ml of hydrazine was added and the mixture was blended homogeneously, put in a high temperature furnace, the temperature was raised gradually to 450° C., held at that temperature for 0.5 hr., then taken out and allowed to cool down. The cerium zirconium composite oxide was obtained, the specific surface area thereof was 40.8 $m^2/g$.

EXAMPLE 5

981 g of cerium oxalate, 268 g of zirconium oxychloride and 32 g of lanthanum oxalate were mixed and stirred homogeneously, dried at 100° C., then taken out from the oven and allowed to cool down, 500 ml of hydrazine oxalate was added and stirred homogeneously, the mixture was put into a high temperature furnace, the temperature was raised gradually to 500° C., held at that temperature for 0.5 hr., then taken out and allowed to cool down. A light yellow cerium zirconium composite oxide was obtained, the specific surface area thereof was 120 m²/g, and the ignition loss after igniting at 900° C. for 1 hour was 2.5%.

EXAMPLE 6

1105 g of cerium carbonate and 280 g of zirconium oxychloride was mixed and stirred homogeneously, dried at 100° C., taken out from the oven and allowed to cool down, 300 ml of hydrazine was added and blended homogeneously, the mixture was put into a high temperature furnace and heated to 450–500° C., held at that temperature for 0.5 hour, taken out and cooled down. A light yellow cerium zirconium composite oxide was obtained, the specific surface area thereof was 91.6 m²/g.

EXAMPLE 7

1.4 g of cerium oxalate and 7 g of zirconium carbonate were mixed and stirred homogeneously, dried at 100° C., taken out from the oven and allowed to cool down, 20 ml of hydrazine was added and stirred homogeneously, the mixture was put into a high temperature furnace and heated to 850–900° C., held at that temperature for 1 hour, taken out from the furnace and allowed to cool down. A light yellow cerium zirconium composite oxide was obtained, the specific surface area thereof was 30.1 m²/g.

EXAMPLE 8

20 g of cerium oxalate, 20 g of zirconium oxychloride and 5 g of lanthanum oxalate were mixed and stirred homogeneously, 20 ml of hydrazine was added and stirred homogeneously, the mixture was put into a high temperature furnace and heated to 450–500° C., held at that temperature for 0.5 hour, taken out from the furnace and allowed to cool down. A light yellow cerium zirconium composite oxide was obtained, the specific surface area thereof was 67.8 m²/g.

EXAMPLE 9

20 g of cerium oxalate, 2 g of zirconium oxychloride and 0.2 g of aluminum hydroxide were mixed and stirred homogeneously, dried at 110° C., taken out from the oven and allowed to cool down, 30 ml of hydrazine was added and stirred homogeneously, the mixture was put into a high temperature furnace and heated to 400–450° C., held at that temperature for 0.5 hour, taken out from the furnace and allowed to cool down. A light yellow cerium zirconium composite oxide was obtained, the specific surface area thereof was 104.8 m²/g.

EXAMPLE 10

2 g of cerium nitrate, 20 g of zirconium oxychloride and 0.5 g of yttrium oxalate were mixed and stirred homogeneously, dried at 100° C., taken out from the oven and allowed to cool down, 20 ml of hydrazine was added and stirred homogeneously, the mixture was put into a high temperature furnace and heated to 550–600° C., held at that temperature for 0.5 hour, taken out from the furnace and allowed to cool down. A light yellow cerium zirconium composite oxide was obtained, the specific surface area thereof was 26.2 m²/g. The ignition loss was 2.8%.

EXAMPLE 11

10 g of cerium hydroxide and 2 g of zirconium carbonate were mixed and stirred homogeneously, dried at 100° C., taken out from the oven and allowed to cool down, 50 ml of hydrazine nitrate was added and stirred homogeneously, the mixture was put into a high temperature furnace and heated to 500–550° C., held at that temperature for 1 hour, taken out from the furnace and allowed to cool down. A light yellow cerium zirconium composite oxide was obtained, the specific surface area thereof was 54 m²/g.

The excellent properties of the nanocrystal cerium zirconium composite oxide of the present invention have been further illustrated by the above examples. The composite oxide of the present invention has obvious advantages compared with the prior art products. The examples disclosed herewith are for the purpose of illustration only, the invention is not limited to these examples. Persons skilled in the art will understand that any changes and modifications with respect to these examples which do not depart from the spirit and scope of the present invention are also included in the invention.

What is claimed is:

1. A nanocrystal cerium zirconium composite oxide, wherein said composite oxide comprises 4–98% by weight of $CeO_2$ and 1–95% by weight of $ZrO_2$, wherein the crystalline particle size of said composite oxide is 100 nm or less, wherein the ignition loss of said composite oxide after igniting at 900° C. for one hour is smaller than 5%, and wherein said composite oxide is a thermal decomposition product of a cerium zirconium precursor compound, wherein said thermal decomposition takes place at a temperature of from about 200° C. to about 1000° C., wherein said precursor compound comprises hydrazine or hydrazine salt, a cerium compound, and a zirconium compound, and wherein said cerium compound and said zirconium compound are each selected from the group consisting of nitrate, chloride, oxalate, carbonate, hydroxide, and mixtures thereof.

2. The nanocrystal cerium zirconium composite oxide according to claim 1, wherein said composite oxide comprises 70–98% by weight of $CeO_2$.

3. The nanocrystal cerium zirconium composite oxide according to claim 2, wherein said composite oxide further comprises 0.01–10% by weight of other elements selected from the group consisting of hafnium, silicon, aluminum, molybdenum, and rare earth elements.

4. The nanocrystal cerium zirconium composite oxide according to claim 3, wherein the specific surface area of said composite oxide is 5–120 m²/g.

5. The nanocrystal cerium zirconium composite oxide according to claim 2, wherein the specific surface area of said composite oxide is 5–120 m²/g.

6. The nanocrystal cerium zirconium composite oxide according to claim 1, wherein said composite oxide further comprises 0.01–10% by weight of other elements selected from the group consisting of hafnium, silicon, aluminum, molybdenum, and rare earth elements.

7. The nanocrystal cerium zirconium composite oxide according to claim 6, wherein the specific surface area of said composite oxide is 5–120 m²/g.

8. The nanocrystal cerium zirconium composite oxide according to claim 1, wherein the specific surface area of said composite oxide is 5–120 m²/g.

9. The nanocrystal cerium zirconium composite oxide according to claim 1, wherein said composite oxide remains as a single phase after igniting at 1000° C. for 12 hours.

10. The nanocrystal cerium zirconium composite oxide according to claim 1, wherein said composite oxide remains as a single phase after igniting at 1100° C. for 12 hours.

11. A method for preparing a nanocrystal cerium zirconium composite oxide comprising thermally decomposing a cerium zirconium precursor compound to form the composite oxide, wherein the thermal decomposition takes place at a temperature of from about 200° C. to about 1000° C., wherein said precursor compound comprises hydrazine or hydrazine salt, a cerium compound, and a zirconium compound, wherein said cerium compound and said zirconium compound are each selected from the group consisting of nitrate, chloride, oxalate, carbonate, hydroxide, and mixtures thereof, and wherein said cerium zirconium precursor compound is prepared by adding said hydrazine or hydrazine salt to an aqueous solution of said cerium compound, adding said hydrazine or hydrazine salt to an aqueous solution of said zirconium compound, mixing said solutions of said cerium compound and zirconium compound together, and co-precipitating said cerium zirconium precursor compound.

12. A method for preparing a nanocrystal cerium zirconium composite oxide comprising thermally decomposing a cerium zirconium precursor compound to form the composite oxide, wherein the thermal decomposition takes place at a temperature of from about 200° C. to about 1000° C., wherein said precursor compound comprises hydrazine or hydrazine salt, a cerium compound, and a zirconium compound, wherein said cerium compound and said zirconium compound are each selected from the group consisting of nitrate, chloride, oxalate, carbonate, hydroxide, and mixtures thereof, and wherein said cerium zirconium precursor compound is prepared by adding said hydrazine or hydrazine salt to a mixture comprising an aqueous solution of said cerium compound and an aqueous solution of said zirconium compound and co-precipitating said cerium zirconium precursor compound.

13. A method for preparing a nanocrystal cerium zirconium composite oxide comprising thermally decomposing a cerium zirconium precursor compound to form the composite oxide, wherein the thermal decomposition takes place at a temperature of from about 200° C. to about 1000° C., wherein said precursor compound comprises hydrazine or hydrazine salt, a cerium compound, and a zirconium compound, wherein said cerium compound and said zirconium compound are each selected from the group consisting of nitrate, chloride, oxalate, carbonate, hydroxide, and mixtures thereof, and wherein said cerium zirconium precursor compound is prepared by directly mixing solid samples of said cerium compound and zirconium compound with said hydrazine or hydrazine salt and homogeneously agitating the mixture comprising said cerium compound, said zirconium compound, and hydrazine or hydrazine salt.

* * * * *